United States Patent [19]

Weiland et al.

[11] 4,028,000
[45] June 7, 1977

[54] BLADE CONNECTION FOR HELICOPTER ROTOR BLADES

[75] Inventors: Emil Weiland, Hohenbrunn; Alois Schwarz, Putzbrunn; Hubert Frommlet, Munich, all of Germany

[73] Assignee: Messerschmitt-Bolkow-Blohm GmbH, Munich, Germany

[22] Filed: Oct. 31, 1975

[21] Appl. No.: 627,702

[30] Foreign Application Priority Data

Nov. 8, 1974 Germany .......................... 2452974

[52] U.S. Cl. .................. 416/107; 416/140
[51] Int. Cl.² ........................................ B64C 27/42
[58] Field of Search ................. 416/107, 140, 106; 188/1 B, 129

[56] References Cited

UNITED STATES PATENTS

| | | | |
|---|---|---|---|
| 1,948,457 | 2/1934 | Larsen | 416/106 |
| 2,284,717 | 6/1942 | Bennett | 416/107 |
| 2,494,985 | 1/1950 | Campbell | 416/106 |
| 2,952,030 | 9/1960 | Guilbert | 188/129 X |
| 3,552,880 | 1/1971 | Fischer | 416/107 X |
| 3,591,310 | 7/1971 | Mouille | 416/140 X |
| 3,759,631 | 9/1973 | Rybicki | 416/140 X |
| 3,842,945 | 10/1974 | Potter | 188/1 B |
| 3,923,419 | 12/1975 | Mouille | 416/107 |

Primary Examiner—Everette A. Powell, Jr.
Attorney, Agent, or Firm—Woodhams, Blanchard and Flynn

[57] ABSTRACT

Resilient drive means for a helicopter rotor blade. The rotor blade is pivotally supported on a stub shaft which is in turn supported on the rotor hub. First means are fixed to the rotor blade and second means fixed to the stub shaft with resilient and adjustable means positioned therebetween for controlling the angular relationship between the rotor blade and the stub shaft. In this embodiment, said first means comprise a shoulder which projects from the rotor blade and the second means comprise a rectangular hollow frame which is fixed to the stub shaft. The shoulder projects into the hollow frame. Threaded means acting through resilient means holds the first and second means in selected pivotal adjustment with respect to each other but the resilient component thereof permits sufficient slight lead lag movement therebetween as to effect damping of the lead lag mode of the rotorblade. The adjustment capability permits sufficient adjustment of the blade with respect to the hub to ensure desired balance between the several blades of a given rotor.

9 Claims, 2 Drawing Figures

BLADE CONNECTION FOR HELICOPTER ROTOR BLADES

FIELD OF THE INVENTION

The invention relates to a blade connection for helicopter rotor blades, comprising a blade fastening pin and a damped connection between blade mounting a rotor hub.

BACKGROUND OF THE INVENTION

A blade connection of this general type is disclosed in U.S. Pat. No. 2,501,250. The blade mounting and the rotor hub are therein connected by a rod, into which a damping member is inserted. The damping member has the purpose of damping the lead lag mode of the rotor blades about the axis of each blade fatening pin, so that they are not transmitted onto the rotor shaft and thus onto the cabin. Further, by this means control is secured over the frequency behavior in the axis of the blade fastening pin.

A damping of the lead lag mode of the rotor blades is further secured by suitably selecting the material of the rotor blades, by controlling the friction between blade and blade mounting and by providing a rubber sleeve on the locking pin. However, the friction can spread which causes deviations in the damping.

However, the known blade connection has the disadvantage that an out-of-track condition can occur in a rotating rotor in consequence of errors of the sweepback angle caused by manufacture inaccuracies. This out-of-track condition must be balanced by trim weights in the main pin, which complicates the manufacture of the rotor and increases its weight.

Sweepback adjusting devices with push-pull struts and ball-and-socket joints between rotor blade and blade mounting or pull-in bolts are known. However, their lifetime is relatively short because of the alternating load caused by the lead lag moments.

Therefore the basic purpose of the invention is to produce a blade connection, which permits an adjustment of the sweepback angle of the rotor blades together with a good damping of the lead lag mode of the same.

SUMMARY OF THE INVENTION

This purpose is attained according to the invention by a shoulder which is secured on the blade mounting by a carrier bracket which in turn is secured on the hub. Two pressure screws are provided which can be adjusted against one another and which engage the shoulder from opposite sides in the direction of rotation around the axis of the blade fastening pin. Elastomeric dampers are inserted between the shoulder and the pressure screws.

The blade connection of the invention satisfactorily attains the above-described purpose. Further, the damping can be adjusted by imposing greater or lesser pressure onto the elastomeric dampers within limits determined by their structure. Still further the damping device and the sweepback adjusting device are inventively united in effect as a single structural unit which permits the obtaining of a compact construction.

According to a further development of the invention, the carrier bracket is secured on the hub by means of a releasable pin which is advantageously arranged parallel with the sweepback axis.

To fold the rotor, the fastening pin can be withdrawn and the blade including the damping and adjusting device can be pivoted about the blade fastening pin without disturbing the adjustment of the pressure screws. In order to provide the elastomeric dampers as much as possible with uniform characteristics, they are advantageously built of layers laminated in the direction of lead lag motion. By changing the type of elastomer and the thickness thereof, the characteristics of the damper can be selected as desired.

Metal plates are advantageously vulcanized, or otherwise adhered, onto the outer elastomeric laminations. In this manner, the elastomeric is protected and the dampers can be mounted by means of guide pins or screws on the carrier bracket or on the shoulder which is secured to the blade mounting.

According to a further embodiment, the side walls which contact the side surfaces of the shoulder can be connected to the elastomeric dampers so that the shoulder is enclosed by a continuous structural part. The lead lag moments are thus mainly transmitted through the end walls between the shoulder and the pressure screws whereby shear stresses are created in said end walls. Through this arrangement it is possible to further vary the damping characteristic of the elastomeric dampers.

The side walls of the dampers are advantageously built of elastomeric layers which are at least substantially parallel to the end surfaces of the shoulder, in order to further determine the damping characteristic.

The parts of the so-constructed damping member, which parts are arranged between the pressure screws and the surfaces which lie directly opposite said pressure screws, can be constructed hollow in order to substantially avoid a power transmission between the pressure screws and the surfaces of the shoulder which lie opposite said pressure screws.

BRIEF DESCRIPTION OF THE DRAWINGS

The invention will be discussed more in detail in connection with the exemplary embodiment illustrated in the drawing, in which.

DETAILED DESCRIPTION

Figure 1:
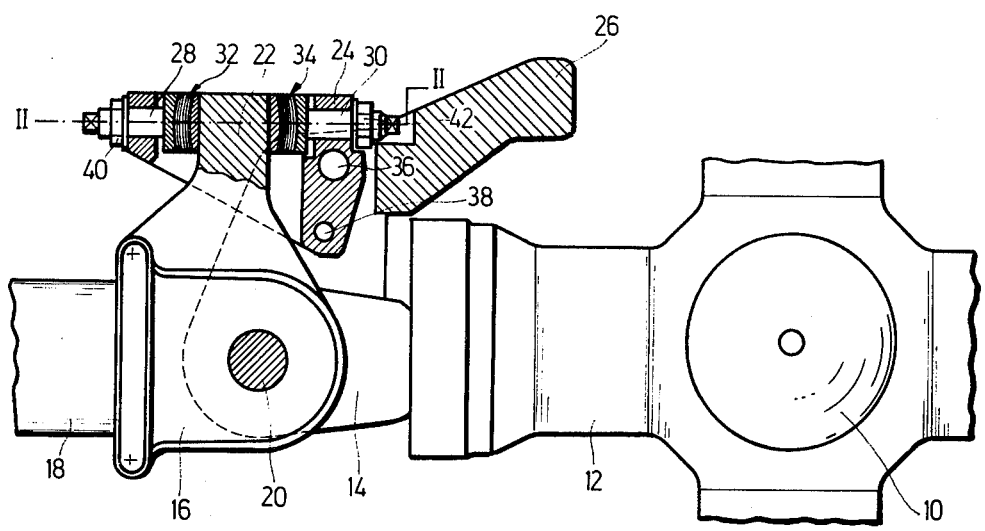
FIG. 1 is a top view of a blade connection, which top view if cut partly along the line I—I of FIG. 2.

A rotor hub is secured on the rotor mast 10. Said rotor hub consists of an outer sleeve 12 which is stationary with respect to the rotor mast 10 and an inner sleeve 14 which can be rotated relative to said outer sleeve. The blade mounting 16, which carries the only partly illustrated rotor blade 18, is supported in the fork-shaped end of the inner sleeve 14 by means of a blade fastening pin 20.

Figure 2:
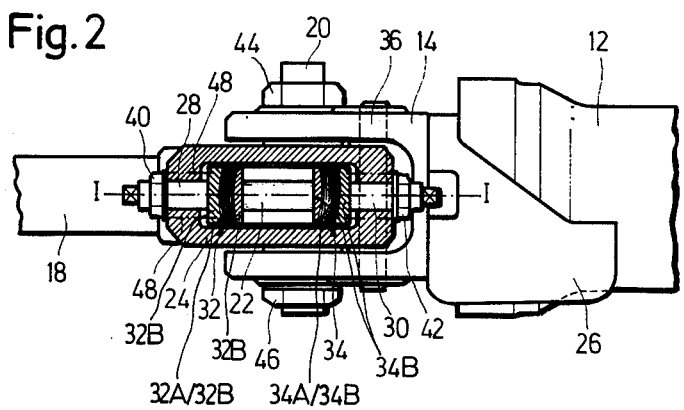
FIG. 2 is a side view of the blade connection which is cut partly along the line II—II of FIG. 1.

A shoulder 22 is secured on the blade mounting 16 and a control lever 26 is secured onto the inner sleeve 14. Shoulder 22 and control lever 26 are advantageously formed on the blade mounting 16 and the inner sleeve 14, respectively. A carrier bracket 24 which is constructed in the form of a hollow rectangle (FIG. 2) is also secured on the inner sleeve 14 by means of bolts 36 and 38 which are positioned parallel with the fastening pin 20. The shoulder 22 extends into the opening of the carrier bracket 24. Pressure screws 28 and 30 are screwed into the sides of the carrier bracket 24, which sides are opposite one another in direction of lead lag motion, which pressure screws each bear against elastomeric dampers 32 and 34, respectively. Said elastomeric dampers are respectively arranged between the pressure screw 28 and the shoulder 22 and between the pressure screw 30 and the shoulder 22. The pressure screws 28 and 30 are secured with respect to one another, and the blade fastening pin 20 is also secured in place by the nuts 40, 42 for the pressure screws and the nuts 44 and 46 for the pin 20, together with additional conventional safety devices as desired.

The elastomeric dampers 32, 34 consist of several superposed rubber layers 32A, 34A and metal plates 32B, 34B. Said metal plates are vulcanized or otherwise adhered to the outer rubber layers so that the pressure screws 28 and 30 each press onto one metal plate and also a metal plate rests on the shoulder 22. The outer metal plates are secured by means of guide pins or guide screws schematically indicated at 48 on the ends of the hollow rectangular mounting 24, which ends are opposite one another in direction of lead lag motion. The rubber layers and metal plates are positioned substantially parallel with the end walls of the shoulder 22.

The sweepback angle of the rotor blade can be adjusted by selectively tightening or loosening the pressure screws 28 and 30, through which out-of-track conditions of the rotor can easily be balanced. The pressure, which through the pressure screws 28, 30 is applied onto the elastomeric dampers 32, 34, can thereby be adjusted so that their damping can change within certain limits and can be adjusted with respect to one another. If the releasable bolts 36 and 38 are withdrawn, the rotor blades can be folded without changing the adjustment of the pressure screws.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a blade connection for helicopter rotor blades, comprising a blade fastening pin and a damped connection between a blade mounting member and a rotor hub, the improvement comprising a shoulder secured on said blade mounting member, a carrier bracket secured on said rotor hub and supporting two oppositely oriented adjustable pressure screws adjustable toward and away from one another in direction of rotation around the axis of said blade fastening pin and elastomeric dampers inserted between said shoulder and said pressure screws.

2. The improved blade connection according to claim 1, wherein said carrier bracket is secured to said rotor hub by means of at least one releasable bolt.

3. The improved blade connection according to claim 2, wherein the axis of said bolt is arranged parallel with respect to the axis of said blade fastening pin.

4. The improved blade connection according to claim 1, wherein said elastomeric dampers consist of elastomer layers which are layered in said direction of rotation around the axis of said blade fastening pin.

5. The improved blade connection according to claim 4, wherein metal plates are fixed on the outer elastomer layers.

6. The improved blade connection according to claim 1, wherein said elastomeric dampers have side walls which face and engage surfaces on said shoulder.

7. The improved blade connection according to claim 6, wherein said side walls of said elastomeric dampers are built of elastomeric layers which are substantially parallel with said surfaces of said shoulder.

8. The improved blade connection according to claim 4, wherein said direction of rotation is the direction of lead lag motion.

9. A damped blade connection between a helicopter rotor blade and a rotatable hub comprising:
blade mounting means on said blade;
hub mounting means on said hub;
blade fastening pin means for securing said blade and hub mounting means together and for relative movement about the axis of said blade fastening pin means;
shoulder means mounted on said blade mounting means and extending in a direction transverse of the axis of said blade fastening pin means, said shoulder means having a pair of oppositely facing surfaces thereon facing in circumferential directions of said blade fastening pin means;
carrier bracket means secured to said hub mounting means and including a pair of spaced support means thereon, said shoulder means being received in the spacing between said support means with each of said oppositely facing surfaces being opposed by one of said support means;
elastomeric means positioned between said of said surfaces and one of said opposed surface means; and
force applying means on each of said support means for engaging said elastomeric means and effecting a compression of said elastomeric means between said surfaces and said force applying means.

* * * * *

UNITED STATES PATENT AND TRADEMARK OFFICE
CERTIFICATE OF CORRECTION

PATENT NO. : 4 028 000
DATED : June 7, 1977
INVENTOR(S) : Emil Weiland et al

It is certified that error appears in the above-identified patent and that said Letters Patent are hereby corrected as shown below:

Column 4, line 46; change first occurrence of "said" to

---each---.

Signed and Sealed this

Thirteenth Day of September 1977

[SEAL]

Attest:

RUTH C. MASON
Attesting Officer

LUTRELLE F. PARKER
Acting Commissioner of Patents and Trademarks